A. LEVERTY.
Cores for Making Cement Pipes.

No. 150,333. Patented April 28, 1874.

UNITED STATES PATENT OFFICE.

ALEXANDER LEVERTY, OF BRIDGEPORT, CONNECTICUT, ASSIGNOR TO HIMSELF AND SAMUEL E. TODD, OF SAME PLACE.

IMPROVEMENT IN CORES FOR MAKING CEMENT PIPES.

Specification forming part of Letters Patent No. 150,333, dated April 28, 1874; application filed April 2, 1874.

*To all whom it may concern:*

Be it known that I, ALEXANDER LEVERTY, of Bridgeport, in the county of Fairfield and State of Connecticut, have invented a new Improvement in Core for Making Cement Pipe; and I do hereby declare the following, when taken in connection with the accompanying drawings and the letters of reference marked thereon, to be a full, clear, and exact description of the same, and which said drawings constitute part of this specification, and represent, in—

Figure 1:
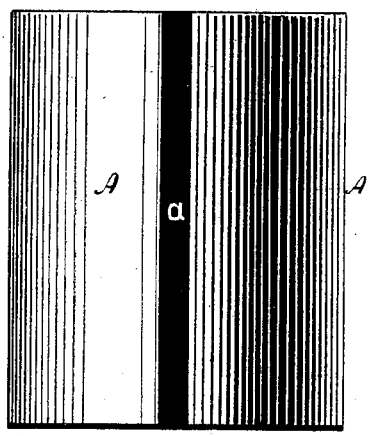
Figure 2:
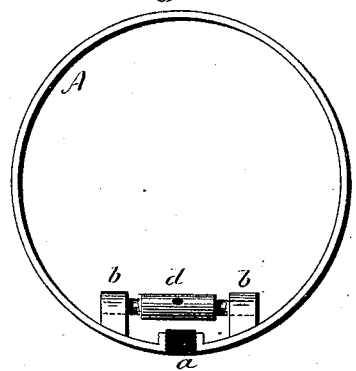

Figure 1, a side view, and in Fig. 2 an end view.

This invention relates to an improvement in the construction of the core for molds in making cement pipe; and the invention consists in a cylinder of sheet metal, slit longitudinally upon one side, and a strip of india-rubber introduced between the two edges; or the slit otherwise filled or covered, and provided with transverse screws upon the inside, taking a bearing each side of the slit, so that, by turning the screws, the two edges may be drawn together to contract the core, the india-rubber yielding for that purpose, the object being to easily remove the core after the pipe has been formed.

A is a sheet-metal cylinder, its diameter corresponding to the size of the pipe to be produced. On one side the cylinder is slit, or the edges brought only so near together as to leave a space between them. This space or slit is filled with india-rubber $a$, or otherwise filled; and upon the inside of the cylinder, near each edge, a lug, $b$, is formed; and between these a screw, $d$, is set, taking into one or both, if both the threads upon the two ends should be reversed, so that, by turning the said screw, the two edges will be brought closer together or forced apart, according to the direction of turning the screw. Several of these screws may be used, according to the length of the cylinder. The body of the screw should be made angular or perforated to afford convenient means for turning.

To form the pipe, the cylinder is expanded to the desired size, the pipe formed in the usual manner, and, after the pipe is complete, turn the screws to contract the cylinder, which allows it to be easily removed.

I claim as my invention—

The herein-described core for cement pipes, consisting of the cylinder having lugs $b\ b$ and adjusting-screws $d$, in combination with the elastic strip secured between the edges of the cylinder, substantially as and for the purpose set forth.

ALEXANDER LEVERTY.

Witnesses:
E. B. STEVENS,
B. W. STEVENS.